United States Patent [19]

Lodini

[11] Patent Number: 4,977,386

[45] Date of Patent: Dec. 11, 1990

[54] ELECTRIC RESISTOR PRODUCIBLE IN A WIDE RANGE OF SPECIFIC RESISTANCE VALUES, AND RELATIVE MANUFACTURING PROCESS

[75] Inventor: Paolo Lodini, Turin, Italy

[73] Assignee: Leda Logarithmic Electrical Devices for Automation S.R.L., Turin, Italy

[21] Appl. No.: 248,493

[22] Filed: Sep. 23, 1988

[30] Foreign Application Priority Data

Oct. 13, 1987 [IT] Italy ............................... 67862 A/87

[51] Int. Cl.$^5$ ............................................ H01H 11/00
[52] U.S. Cl. ..................................... 338/114; 264/104; 264/108; 264/118; 264/128
[58] Field of Search ............... 264/104, 108, 118, 120, 264/325, 125, 128; 252/511; 338/114

[56] References Cited

U.S. PATENT DOCUMENTS

| | | | |
|---|---|---|---|
| 3,302,272 | 2/1967 | Braun | 264/104 |
| 3,564,705 | 2/1971 | Cochardt | 264/108 |
| 3,725,521 | 4/1973 | Ebling | 264/104 |
| 3,808,678 | 5/1974 | Kubo et al. | 264/140 |
| 4,008,300 | 2/1977 | Ponn | 264/104 |
| 4,067,945 | 1/1978 | DuRocher | 264/104 |
| 4,209,481 | 6/1980 | Kashiro et al. | 264/108 |
| 4,292,261 | 9/1981 | Kotani et al. | 264/108 |
| 4,778,636 | 10/1988 | Krieg et al. | 264/104 |
| 4,790,968 | 12/1988 | Ohkawa et al. | 264/104 |

FOREIGN PATENT DOCUMENTS

| | | | |
|---|---|---|---|
| 2554758 | 5/1985 | France | 264/104 |
| 149441 | 7/1981 | German Democratic Rep. | 264/104 |
| 58-128839 | 8/1983 | Japan | 264/104 |
| 61-5503 | 1/1986 | Japan | 264/104 |

Primary Examiner—Jeffery Thurlow
Attorney, Agent, or Firm—Klauber & Jackson

[57] ABSTRACT

A resistor including a matrix formed from flexible, insulating material, and metal particles distributed uniformly inside the matrix; which resistor is characterized by the fact that the particles are obtained from mechanical machining chips produced using tools including agglomerates of abrasive granules, and which are passed over the surface of the workpiece; and which particles are magnetized by passage of the aforementioned tool over the surface of the workpiece.

14 Claims, 3 Drawing Sheets

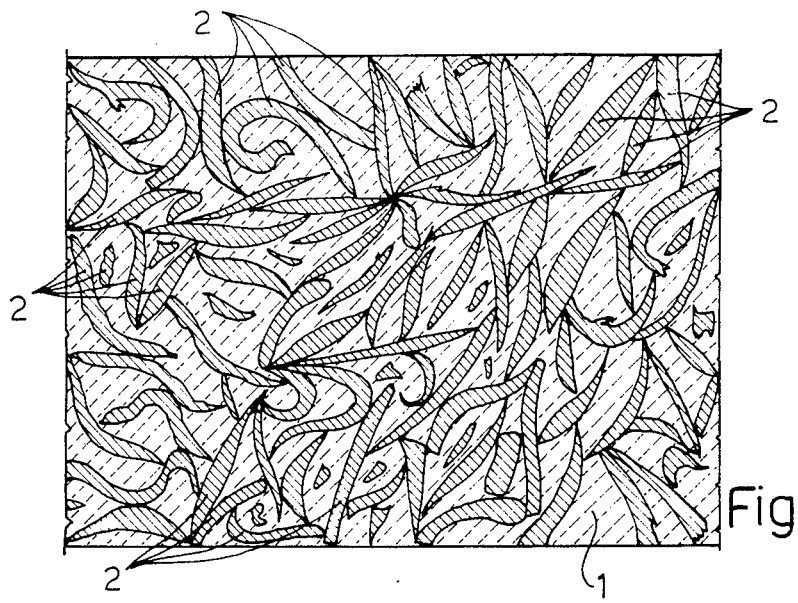
Fig.1
Fig.2
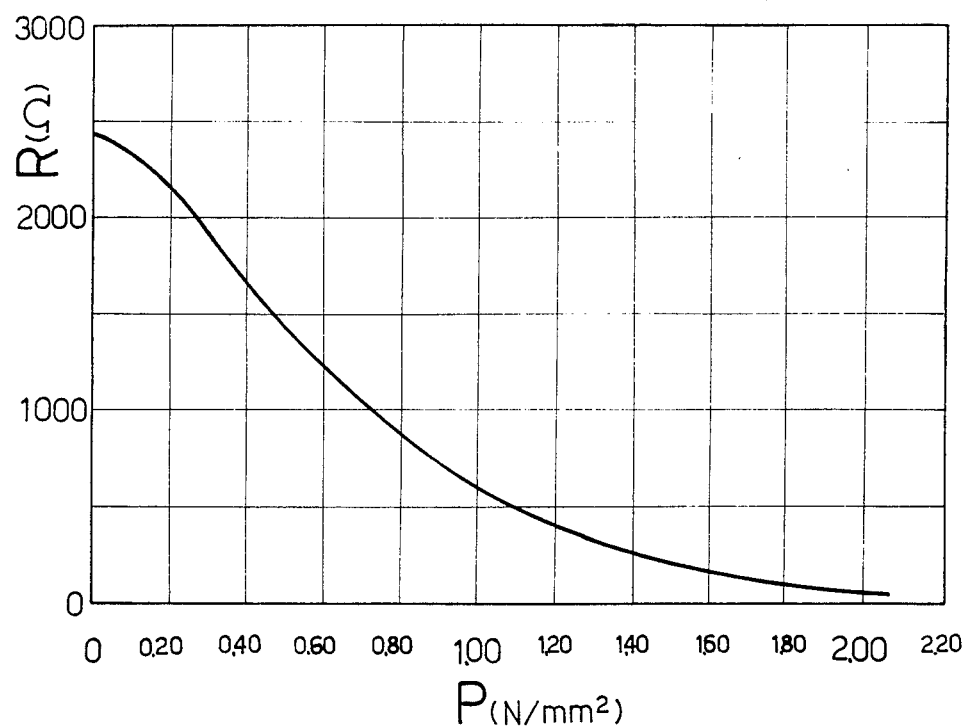

ELECTRIC RESISTOR PRODUCIBLE IN A WIDE RANGE OF SPECIFIC RESISTANCE VALUES, AND RELATIVE MANUFACTURING PROCESS

BACKGROUND OF THE INVENTION

The present invention relates to an electric resistor comprising a matrix formed from flexible, insulating material, and metal particles arranged uniformly inside the said matrix; and to a process for manufacturing the said resistor.

Electric resistors are known, which substantially comprise a matrix of flexible, insulating material, e.g. synthetic plastic, and metal powder arranged uniformly inside the said matrix. A drawback of known resistors of the aforementioned type, however, is that they cannot be employed as electric conducting elements in electric circuits, on account of the exceptionally high resistance they present when idle. In fact, the specific conductivity of known resistors, produced using various processes, is only high enough for them to be employed as electric conducting elements, when the resistors themselves are subjected to fairly high pressure. This is because the electric resistance of resistors of the aforementioned type falls alongside increasing pressure on the resistor, whereas, when idle, i.e. in the absence of external pressure, the said resistors assume substantially infinite resistance values. Furthermore, the electrical characteristics of resistors of the aforementioned type do not remain constant throughout the working life of the resistor, and are also difficult to reproduce productionwise.

To overcome the aforementioned drawback, resistors of the aforementioned type have been proposed whereby the powder distributed uniformly inside the said matrix consists of a mixture of powders of specific, controlled shape and grade, and, more generally speaking, having specific physical and chemical properties. Resistors so formed, however, are obviously extremely expensive, on account of the numerous operations involved for preparing the said mixture, and the high cost of the raw materials required for producing the powders themselves.

In some cases, to improve the electrical characteristics of the resistors, use is made of highly complex processes also involving numerous operations, as well as special equipment.

SUMMARY OF THE INVENTION

The aim of the present invention is to provide an electric resistor of the aforementioned type, but involving none of the aforementioned drawbacks.

A first aim of the present invention is, therefore, to provide an electric resistor whose electric resistance when idle, i.e. in the absence of external pressure, is sufficiently low to enable the resistor to be employed as an electric conducting element in any type of electric circuit.

A second aim of the present invention is to provide an electric resistor which, in addition to presenting the aforementioned favourable property, is producible using an extremely straightforward, easily reproducible manufacturing process involving low-cost, readily available raw materials.

A third aim of the present invention is to provide a resistor of the aforementioned type, whose electric resistance falls considerably alongside increasing pressure applied on the resistor itself.

A fourth aim of the present invention is to provide a resistor which is magnetically permeable enough to be used as a d.c. magnetic core for the construction, for example, of small electromagnets.

Finally, a fifth aim of the present invention is to provide an electric resistor whose aforementioned favourable characteristics remain substantially unchanged throughout the working life of the resistor, and are accurately reproducible.

With these aims in view, according to the present invention, there is provided an electric resistor designed for use as an electric conducting element in an electric circuit, said resistor comprising a matrix formed from flexible, insulating material and particles of ferromagnetic metal distributed uniformly inside the said matrix; characterised by the fact that the said particles are obtained from mechanical machining chips produced using tools comprising agglomerates of abrasive granules and which are passed over the surface of the workpiece; the said particles being magnetized by the said passage of the said tool over the surface of the said workpiece.

According to the present invention, there is also provided a process for producing the aforementioned resistor, said process comprising at least a first stage consisting in the preparation of a homogeneous system composed of a liquid material which, when solidified, is both flexible and electrically-insulating, and metal particles obtained from mechanical machining chips produced using tools comprising agglomerates of abrasive granules and which are passed over the surface of the workpiece; and at least a second stage consisting in solidifying the said liquid material, so as to form a matrix in which the said particles are distributed uniformly.

BRIEF DESCRIPTION OF THE DRAWINGS

The structural characteristics and favourable properties of the resistor according to the present invention, and the various stages in the process for producing the same, will be described with reference to the accompanying drawings, in which:

FIG. 1 shows a structural section of a portion of the resistor according to the present invention;

FIG. 2 shows a graph of the electric resistance of the resistor as a function of varying pressure applied on the same;

DETAILED DESCRIPTION OF THE INVENTION

Figure 3:
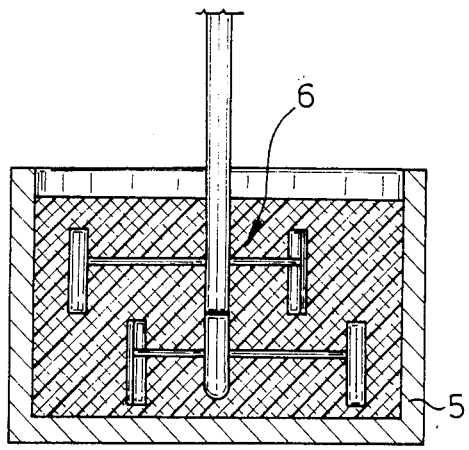
FIGS. 3 to 8 show schematic views of various stages or operations in the process according to the present invention.

The resistor according to the present invention presents a structure as shown in FIG. 1, and substantially comprises a supporting matrix 1 formed from flexible, electrically-insulating material, and particles 2 of electrically-conductive material distributed substantially uniformly inside the said matrix. A basic characteristic of the present invention is that particles 2 are obtained from mechanical machining chips produced using tools comprising agglomerates of abrasive granules and which are passed over the surface of the workpiece. In particular, the said particles 2 are obtained from mechanical machining chips produced by grinding steel or cast iron mechanical components. The shape and size of the particles so formed depend on the materials from which they are formed, and on the characteristics of the machining operation and tools involved. Generally speaking, the said particles are of elongated shape as shown in FIG. 1. In the case of a mixture of standard type mechanical machining chips, maximum particle size ranges from approximately 20 to 400 micron.

Passage of the tool over the surface of the workpiece, and the manner in which each particle is removed from the said surface, has been found to produce in each particle a longitudinal magnetic field identical to that of an elementary magnet. The loose particles so formed, and prepared as described in more detail later on, therefore tend to form structures in which the various magnetic particles are, at least partially, linked together; which structures, as demonstrated later on, are also preserved on the resistor illustrated in FIG. 1.

The material of matrix 1, which must be both flexible and electrically-insulating, is preferably, but not necessarily, so precompressed inside the said matrix as to exert sufficient pressure on particles 2 to maintain contact between the same. Each infinitesimal element of material 1 can therefore be said to be in such a state of triaxial precompression as to exert on adjacent elements, and particularly particles 2, sufficient stress to produce far greater contact pressure between the surfaces of particles 2 than would be possible in the absence of such triaxial precompression. Such a state of precompression is a direct consequence of the process according to the present invention, and which will be described in detail later on. The material of matrix 1 may be any type of electrically-insulating material, providing it is flexible enough to flex when a given pressure is applied on the resistor, and to return to its original shape when such pressure is removed. Furthermore, the said material must be capable of assuming a first liquid state, and a second state wherein it is both solid and flexible. Depending on the requirements posed, in each individual case, by the various stages in the process described later on, materials such as natural and synthetic rubber, or numerous types of synthetic thermoplastic resins and, in particular, silicon rubber and epoxy resin, may be employed.

Whichever material is used, solidification will be performed according to the known technique pertaining to that particular type of material.

The resistor according to the present invention, which is structured as shown schematically in FIG. 1, therefore presents an extremely large number of contacting particles 2 of conductive material. Such a large number of contact points between the said particles 2 is partly due to the magnetic pull exerted between the said particles, each of which, as already stated, presents a longitudinal magnetic field which, in the course of the process described in more detail later on, causes the particles to settle into chain structures which are substantially preserved inside the resistor. Another factor responsible for increasing the contact points between the said particles 2 is the said state of triaxial precompression of the matrix material, which exerts sufficiently high pressure on the surfaces of particles 2 to increase the contact pressure between the mating surfaces of the same.

This results in the formation, inside the said structure, of electrical conductors, each consisting of a chain comprising an extremely large number of contacting particles 2. When the resistor is subjected to sufficient external pressure to flex the material of matrix 1, the contact pressure between particles 2 increases to produce the favourable characteristics described in detail later on. When connected to an electric circuit, the resistor according to the present invention operates as follows.

When idle, i.e. in the absence of external pressure on the resistor, electric current may be circulated through it, as on an ordinary rheophore. Even in the said idle condition, the resistor may be supplied with high current densities, even ranging as high as a few $A/cm^2$. In the said idle condition, therefore, the electric resistance of the resistor according to the present invention is low enough to produce an electric conductor capable of accommodating a current density high enough for supplying a component or electrical device forming part of an electric circuit. A number of resistance values relative to resistors produced using various types of particles 2, matrix materials, and processing parameters, are shown in the examples given further on.

When pressure is applied on the resistor, resistance decreases gradually as shown by the curve on the FIG. 2 graph, which shows, by way of example, the resistance-pressure relationship of a resistor having the characteristics described in Example 3.

Such favourable performance of the resistor, when subjected to external pressure, is probably due to the improved conductivity of the chains of particles 2. In fact, as external pressure increases, the conductivity of the contacting-particle chains increases due to the increased contact pressure between adjacent particles 2. The elasticity of the matrix material obviously also contributes towards achieving this.

The amount of external pressure applied therefore determines the structural configuration and, hence, total conductivity of the resistor. When such external pressure is removed, the resistor returns to its original unflexed configuration, and original resistance is restored.

The aforementioned characteristics of the resistor have been found to be substantially unaffected by soiled particles or foreign bodies. As the said particles are obtained from mechanical machine grinding chips, they may easily be soiled with oil or grease contained in the cutting fluid used during grinding. Furthermore, metal particles 2 may be contaminated, to a greater or lesser degree, by extraneous material, particularly granules of the abrasive material forming the abrasive agglomerates of the tools employed in the aforementioned mechanical machining operations. Traces of oil or grease on the surface of particles 2, or granules of abrasive material mixed in with particles 2 or inside the matrix material, have been found to have substantially no effect on the electrical characteristics, long-term stability or reproducibility of the resistor according to the present invention.

To demonstrate the electrical performance of the resistor according to the present invention, three examples will now be given relative to resistors produced using various structural parameters.

EXAMPLE 1

A cylindrical resistor, 18.9 mm in diameter and 11 mm high, was prepared using epoxy resin (VB ST-29) for matrix 1.

Particles 2 of conducting material were obtained from a mixture of chips produced by grinding cast iron components and using various types of grinding wheels under various machining conditions. Particles 2 were obtained from the said chips as described later on with reference to the process according to the present invention.

The specific weight of the resulting resistor was 2.45 g/cm$^3$.

A pressure of 10 N/mm$^2$ was applied on the homogeneous system consisting of matrix material 1 in its liquid state and particles 2, during solidification of the said material in the course of the process described in more detail later on.

In the idle condition, the resistance between the two flat surfaces of the cylinder was 12 ohm, equivalent to a specific resistance of approximately 21.3 ohm.cm.

EXAMPLE 2

A cylindrical resistor, 12.9 mm in diameter and 17 mm high, was prepared using epoxy resin (VB ST-29) for matrix 1.

Particles 2 of conductive material were obtained as in Example 1.

A pressure of 60 N/mm$^2$ was applied on the homogeneous system consisting of matrix material 1 in its liquid state and particles 2, during solidification of the said material in the course of the process described in more detail later on.

The specific weight of the resulting resistor was 3.18 g/cm$^3$.

In the idle condition, the resistance between the flat surfaces of the cylinder was 0.2 ohm, equivalent to a specific resistance of approximately 0.15 ohm.cm.

EXAMPLE 3

A cylindrical resistor, 11.3 mm in diameter and 5 mm high, was prepared using silicon rubber for matrix 1.

Particles 2 of conductive material were obtained as in the foregoing Examples.

A pressure of 4 N/mm$^2$ was applied on the homogenous system, during solidification of matrix material 1.

The idle resistance of the resistor, measured between the main surfaces of the cylinder, was 2,400 ohm, equivalent to a specific resistance of 4,800 ohm.

Electric resistance decreased alongside increasing external pressure on the said flat surfaces, as shown in the FIG. 2 graph.

A resistor produced as in Example 1 and, particularly, Example 2, was magnetically permeable enough for it to be employed as a magnetic core.

The electric resistor according to the present invention may be produced using the following process.

The first stage consists in preparing a homogeneous system consisting of a liquid material which, when solidified, is both flexible and electrically-insulating, and metal particles 2 obtained from mechanical machining chips produced by tools comprising agglomerates of abrasive granules and which are passed over the surface of the workpiece. In the second stage, the said liquid material is solidified, so as to produce a matrix 1 in which the said particles 2 are distributed uniformly.

For obtaining the said particles 2 with which to form the said homogeneous system, the said chips, as produced in the said mechanical machining operation, are subjected to a number of operations. The said chips emerge from the mechanical machining operation in the form of a spongy pulp substantially consisting of a mixture of metal particles, produced by the mechanical machining operation, and abrasive granules detached from the agglomerates of the abrasive material from which the tools are formed. The said mixture also includes oil and grease emulsions employed as cutting fluid in the course of machining. No major use has yet been found for the said chips, the disposal of large quantities of which poses serious problems for firms engaged in mechanical machining of this type.

For converting such chips into the said particles 2 required for the said homogeneous system, the chips are subjected to a first operation, wherein the liquid and solid components are separated; a second operation, wherein the solid components are dried to produce agglomerates; and a third operation, wherein the said agglomerates are separated into particles.

The said first operation is conveniently performed by applying sufficient pressure on the chips to literally squeeze the same; during which operation, the surplus emulsion impregnating the chips is disposed of mechanically.

The said second operation is performed by drying, e.g. inside an oven, the chips squeezed in the said first operation. The said second operation should be performed in a non-oxidizing atmosphere, due to the fact that small-size metal particles are highly susceptible to oxidation, which, in addition to impairing the surface condition of the particles, may result in a dangerous increase in temperature inside the processed mass.

The said third operation is performed by subjecting the agglomerates to mechanical stress, by means of sifting, vibration or similar.

As already stated, the maximum size of the particles so produced ranges from 20 to 400 micron. Blending different types of mechanical machining chips provides for producing particles whose average size and physical/mechanical characteristics may be reproduced consistently.

As already stated, any traces of oil or grease contained in cutting fluid need not necessarily be removed for the said particles to be employed in the process according to the present invention. The same applies also to small quantities of abrasive granules which, even if they remain blended with the said metal particles subsequent to the aforementioned operations, in no way affect the process or resulting resistor according to the present invention. The particles so formed constitute a sort of powder ranging in density from 0.7 to 0.8 g/cm$^3$ and, being highly magnetic, tend to form into chains. Furthermore, the said particles are elongated and bent into various shapes which, combined with the said chain-forming tendency, results in the formation of tangled masses.

The said first stage, for preparing the said homogeneous system of liquid material and particles 2, may conveniently be performed by mixing the said liquid material and particles 2, for example, inside a container 5 (FIG. 3) using appropriate mixing means, such as mechanical mixer 6. Throughout the said first stage, the said matrix material must remain in its liquid form.

Figure 4:
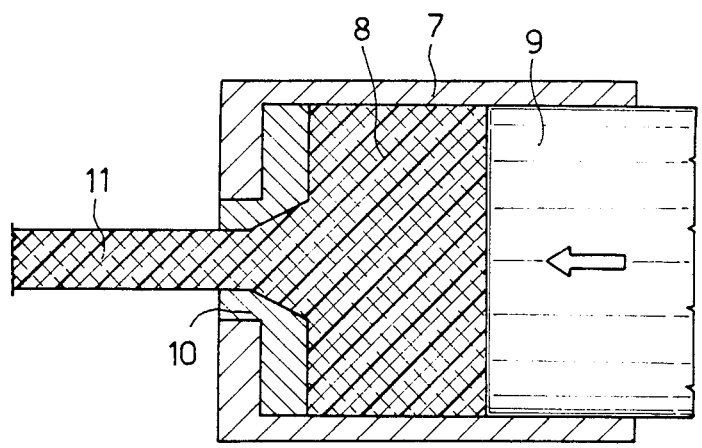

In the said second stage, the matrix material is solidified by means of solidification or curing. This is performed as and within the time demanded by the material involved, and may require accessory, e.g. heating, equipment which does not essentially fall within the scope of this description. During the said solidification or curing stage, the said homogeneous system produced in the said first stage is subjected simultaneously to sufficient pressure to induce major permanent deformation of the said system, e.g. by means of extrusion, rolling, pressing or molding. FIG. 4, for example, shows an extrusion cylinder 7 inside which a mass 8 of the said homogeneous system is forced by a piston 9 through a die 10. After curing, the electrical conductivity of semi-finished product 11 has always been found to be at least 10 times that of mass 8 when allowed to solidify in the idle condition. This may be due to the magnetic and mechanical chain-forming tendency, already mentioned, of the particles in the said homogeneous system, particularly as a result of internal stress during distortion. The same applies also to the other operations mentioned above, which have enabled extrusions and laminates to be obtained with specific resistances ranging from 5,000 to 50 ohm.cm.

Figure 5:
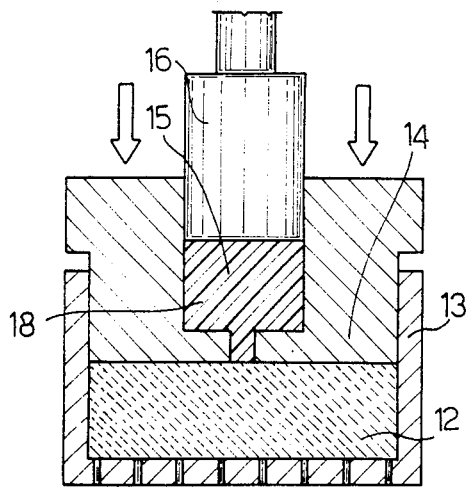
Figure 7:
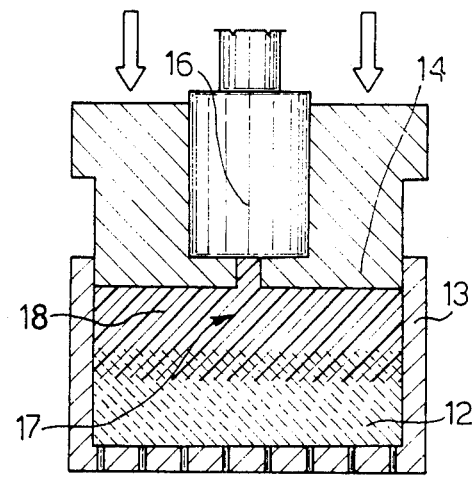
Figure 6:
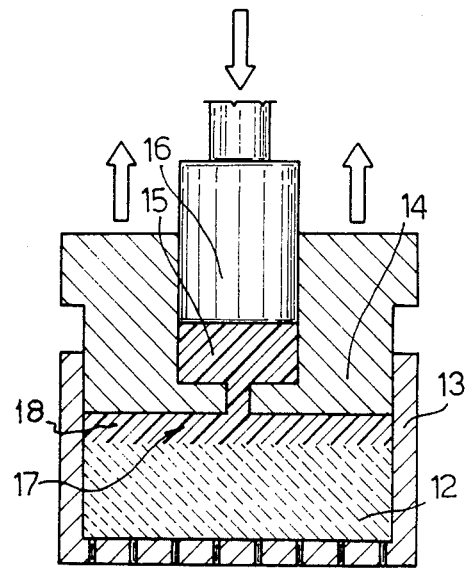

By way of an alternative to the operations described with reference to FIGS. 3 and 4, the two basic stages in the process (preparation and solidification of the said homogeneous system) may be performed by means of the following operations. In a first operation (FIG. 5), a mass of particles 12 is formed, for example, inside container 13. In a second operation, the said mass is compacted by subjecting it to a given pressure, e.g. by means of piston 14. The bottom of the said container 13 is conveniently either porous or provided with holes for enabling the escape of air or gas trapped between the said particles. In like manner, piston 14 provides for forming a structure of substantially contacting particles with gaps inbetween. Piston 14 is conveniently provided with a tank 15 for containing the said liquid material 18, which may be forced by a second piston 16 into a chamber 17 defined by the upper surface of the said particle mass 12 and the bottom surface of the said piston, as shown clearly in FIG. 6. In the next operation (FIG. 6), downward movement of piston 16 and upward movement of piston 14 force the said liquid material 18 inside the said chamber 17. In the next operation (FIG. 7), only piston 14 is moved down, so as to produce a given pressure inside liquid material 18 in chamber 17 and force the said liquid to flow inside the gaps between the particles in the said mass 12, thus producing the said homogeneous system. At the same time, any air is expelled through the porous bottom of container 13. Filtering the said liquid material through the gaps in particle mass 12 has been found to have substantially no effect on the original arrangement of the said particles produced at the compacting stage.

Figure 8:
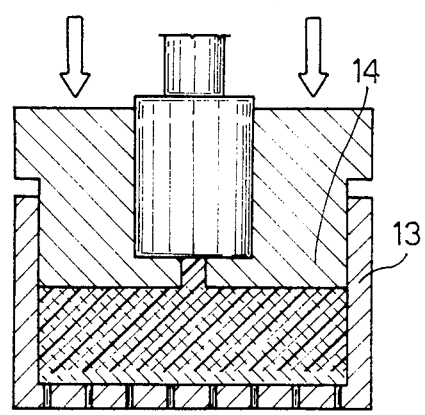

In the last operation in the process (FIG. 8), the homogeneous system of particles and liquid material is solidified as required by the material employed for the said matrix. It has been found necessary to meter the mass of liquid material filling chamber 17 prior to the injection stage, so that the said mass is sufficient to impregnate only large part, and not all, of particle mass 12, leaving a layer of non-impregnated particles. In like manner, the liquid material filtering into the gaps between the said particles is subjected solely to atmospheric pressure (through the porous bottom of container 13), whereas the mass of particles (impregnated or not) is subjected to the pressure exerted by piston 14, as shown clearly in FIG. 8. The said pressure is distributed evenly over all the contact points between adjacent particles, and is what determines the specific electric resistance of the resulting material. That is, using the same type of particle and liquid material, an increase in the said pressure results, within certain limits, in a lower specific electric resistance of the resulting material.

It has been found necessary to maintain the said pressure constant until the said liquid material has solidified. Furthermore, the said pressure must be equal to or greater than the pressure at which the said particle mass 12 is compacted in the previous operation. After solidification, the said pressure determines the state of triaxial precompression already mentioned as being a characteristic of the conducting materials described herein, and the value of which is included in the parameters relative to Examples 1, 2 and 3.

Though the said pressure is selectable from within a vast range, it has been found to conveniently range from a few tenths of a $N/mm^2$ to a few tens of a $N/mm^2$.

The mass of material so formed inside container 13 may be cut, using standard mechanical methods, into appropriate shapes and sizes from which to produce the electric resistor according to the present invention.

To those skilled in the art it will be clear that changes may be made to both the electric resistor and the process for producing the same, as described and illustrated herein, without, however, departing from the scope of the present invention.

I claim:

1. An electric resistor designed for use as an electric conducting element in an electric circuit, said resistor comprising:

a matrix formed from flexible, insulating material;

particles of ferromagnetic metal distributed uniformly inside the said matrix, said particles being constituted by mechanical machining chips produced by passing a tool comprising agglomerates of abrasive granules over the surface of a workpiece, said particles being magnetized by the said passage of the said tool over the surface of the workpiece, said particles having a maximum size ranging from approximately 20 to 400 microns; and said flexible, insulating material of said matrix is in such a state of triaxial precompression which is generated by elastic deformation of said material and which, in the absence of external pressure on the resistor, exerts on said particles sufficient pressure for maintaining contact between the particles in the matrix and permits current flow therethrough with current densities as high as a few $A/cm^2$.

2. A resistor as claimed in claim 1, characterised by the fact that the said flexible, insulating material is capable of assuming a first state, wherein it is sufficiently liquid to produce a homogeneous system of the said particles and the said material in the said liquid state; and a second state wherein it is both solid and flexible.

3. A resistor as claimed in claim 2, characterised by the fact that the said flexible, insulating material is a synthetic resin.

4. A process for producing an electric resistor designed for use as an electric conducting element in an electric circuit, said process comprising the steps of:

obtaining metal particles from mechanical machining chips produced using tools comprising agglomerates of abrasive granules and which are passed over the surface of a workpiece, the step of obtaining said particles including a first step of separating liquid components of said chips from the solid components, a second step of drying said solid components to produce said agglomerates, and a third step of separating said agglomerates into said metal particles;

preparing a homogeneous system composed of a liquid material which, when solidified, is both flexible and electrically-insulating, and said metal particles, in at least a first stage; and solidifying said liquid material in at least a second stage so as to form a matrix in which the said particles are distributed uniformly.

5. A process as claimed in claim 4, wherein the said first step is performed by exerting pressure on the said chips.

6. A process as claimed in claim 4, wherein the said second step is performed by drying the said chips in an oven, subsequent to the said first step.

7. A process as claimed in claim 4, wherein the said third step is performed by applying mechanical stress on the said agglomerates.

8. A process as claimed in claim 4, wherein the said step of preparing is performed by mixing together the said particles and the said liquid material.

9. A process as claimed in claim 4, further comprising an additional step, during the said at least one second stage in which the said material is solidified, of subjecting the said homogeneous system to a given pressure, said pressure being maintained until the said liquid material has solidified.

10. A process as claimed in claim 9, wherein, for exerting the said given pressure on the said homogeneous system, the said homogeneous system is permanently distorted by being subjected to an extrusion, pressing, molding or rolling operation.

11. A process as claimed in claim 4, wherein the said first step is performed by forming a mass of the said particles, compacting said mass by subjecting it to a given pressure, and injecting said liquid material inside the said mass.

12. A process as claimed in claim 11, further comprising an additional step, during said at least one second stage in which the said material is solidified, of subjecting the said material to a given pressure, said pressure being maintained until the said liquid material has solidified.

13. A process as claimed in claim 11, wherein said first step includes the step of forming said mass of particles inside a container; said second step is performed by exerting the said pressure on an upper surface of the said mass and by means of a thrust element; and said third step is performed by first feeding the said liquid material through a channel in the said thrust element, so as to form a layer of given height of the said liquid material over the said mass of particles, and by subsequently exerting, by means of the said thrust element, sufficient pressure for injecting the said liquid material.

14. A process as claimed in claim 13, wherein the mass of the said layer of given height of the said liquid material formed over the said mass of particles is selected so that, subsequent to the said injection operation, a layer of the said mass is left free of the said liquid material.

* * * * *